Jan. 17, 1961  J. R. WHITE  2,968,767

BALANCED CIRCUITS HAVING IMPROVED BALANCE

Filed Feb. 25, 1957

United States Patent Office 2,968,767
Patented Jan. 17, 1961

2,968,767

BALANCED CIRCUITS HAVING IMPROVED BALANCE

John R. White, Westbury, N.Y., assignor to Hazeltine Research, Inc., Chicago, Ill., a corporation of Illinois Filed Feb. 25, 1957, Ser. No. 642,133

4 Claims. (Cl. 329—112)

*General*

This invention relates to balanced circuits and, particularly, to such circuits which employ a similar electron tube in each of the two halves thereof.

Many types of balanced circuits are well known in the electronics art and such circuits include balanced amplifiers, phase detectors, frequency discriminators, multi-vibrators, and the like. These circuits are characterized by having two symmetrical halves with each half including an electron tube of the same type. Where accurately balanced circuit operation is desired, the two electron tubes must have as nearly as possible identical electrical characteristics.

There are on the market many well-known types of so-called "multi-unit" tubes wherein there are enclosed within each tube envelope or "bottle" two or more individual tube units capable of performing separate and, if desired, unrelated functions. Common examples are the so-called "dual" or "twin" tubes which include a pair of diodes or a pair of triodes in the one tube envelope.

As a matter of convenience or perhaps as a matter of economy, it is frequently desirable to utilize such multi-unit tubes in constructing balanced circuits. In fact, at first glance, multi-unit tubes would appear to be the more desirable thing to use in balanced circuits. It has been found, however, that in certain situations it is exceedingly difficult to obtain the required degree of balance where units from the same multi-unit tube are used in the two halves of the balanced circuit. This has been found to be caused by the fact that the two supposedly identical units in the same tube envelope and which are used in the two halves of the balanced circuit are in fact not identical, i.e., their electrical characteristics are not identical. This is usually due to the internal construction of the two tube units being somewhat different. For example, the lead wires connecting the tube electrodes proper to the base prongs of the tube may be of different lengths for the two tube units. This introduces differences in lead wire inductance and interelectrode capacitance which, in turn, tends to upset the balanced nature of an otherwise balanced circuit.

An example of a situation where circuit balance is extremely critical and where it is also desirable to use multi-unit tubes is the case of a balanced phase detector circuit in the color synchronization channel of a color-television receiver. Such phase detector circuits are used to compare the phase of a locally generated 3.6 megacycle reference signal with a received synchronizing phase component of the same frequency. The output of the phase detector controls the operation of the oscillator which generated the local reference signal which, in turn, controls the color-signal detection angles in the receiver. Such a phase detector circuit must be accurately balanced or else undesired errors will be introduced which, in turn, cause incorrect reproduction of the colors of the televised image. Because of the relatively high frequency of the signals involved, namely 3.6 megacycles, differences in lead wire inductance and interelectrode capacitance within the tubes can cause substantial degrees of unbalance.

It is an object of the invention, therefore, to provide new and improved balanced circuits using multi-unit tubes and wherein an improved degree of balance is obtained.

It is another object of the invention to provide a new and improved balanced phase detector system for the color synchronizing channel of a color-television receiver where multi-unit tubes may be utilized without degrading the circuit balance.

In accordance with the invention, in electronics equipment in which at least one balanced circuit is required to operate at relatively high frequencies where variations in tube construction can have an appreciable effect on the balance of the circuit, the improvement of the present invention comprises a first multi-unit tube envelope including two unconnected tube units of the same type but which are of different internal construction and a second multi-unit tube envelope identical to the first tube envelope. The improvement also includes circuit means for interconnecting one of the dual units of the first envelope with a matching one of the dual units of the second envelope to form the desired balanced circuit with an improved degree of balance. The improvement also includes additional circuit means connected to the other of the dual units in the first and second envelopes for utilization thereof.

For a better understanding of the present invention, together with other and further objects thereof, reference is had to the following description taken in connection with the accompanying drawing, and its scope will be pointed out in the appended claims.

Referring to the drawing.

Figure 1:
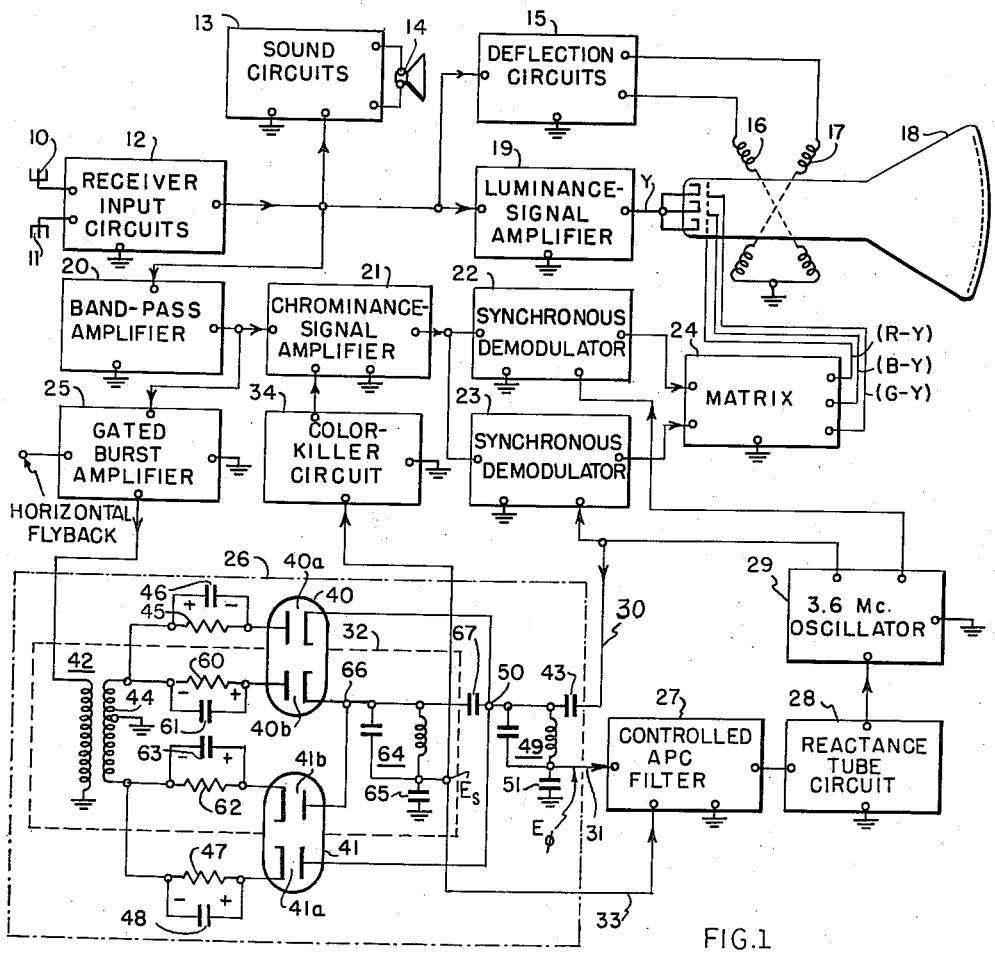
Fig. 1 is a circuit diagram, partly schematic, of a complete color-television receiver including a balanced phase detector system constructed in accordance with the principles of the present invention.

*General description of color-television receiver of Fig. 1*

The present invention shall be more particularly described with reference to the case where it is incorporated into a color-television receiver because such a receiver is of general widespread importance and because such a receiver illustrates a situation where the need for the present invention is very great. Referring therefore to Fig. 1 of the drawing, there is shown a representative form of a complete color-television receiver including a balanced phase detector system constructed in accordance with the principles of the present invention. More particularly, the color receiver of Fig. 1 includes an antenna system 10, 11 for intercepting the transmitted signal and receiver input circuits 12 for amplifying and detecting such signal so that the video-frequency components thereof appear at the output of unit 12. A sound-signal component of the composite video signal appearing at the output of unit 12 is supplied to sound circuits 13 and thence to a loudspeaker 14. Deflection synchronizing components are supplied to deflection circuits 15 and serve to synchronize or control the generation of suitable deflection currents which are supplied to deflection coils 16 and 17 to produce the usual scanning raster on the face of a color picture tube 18 which may be, for example, of the three-gun shadow-mask type.

A luminance-signal component Y of the composite video signal is supplied by way of a luminance-signal amplifier 19 to the cathodes of the picture tube 18. This luminance signal conveys the luminance or brightness information and hence is capable of reproducing a black-and-white image on the face of the picture tube 18. A chrominance-signal portion of the composite video signal is supplied by way of a chrominance-signal channel including units 20-24, inclusive, to the control electrodes of the three guns of the picture tube 18. This chrominance signal carries the additional coloring information which, when added in with the brightness information by means of the control electrodes of the picture tube 18, serves to "color" the black-and-white image. The chrominance signal, commonly referred to as a chrominance subcarrier signal, includes a range of video components spaced about the subcarrier frequency of 3.6 megacycles and is selected by the band-pass amplifier 20, amplified by the chrominance-signal amplifier 21, and then supplied to the synchronous demodulators 22 and 23. The synchronous demodulators 22 and 23 serve to demodulate or detect the modulation components of the chrominance subcarrier at particular phase angles thereof and these detected subcarrier components represent so-called "color-difference" signals. These color-difference signals are then matrixed, i.e., combined in different proportions, in the matrix 24 to obtain the three red, blue, and green color-difference components necessary for the operation of the picture tube 18.

A synchronizing burst component of the composite video signal appearing at the output of unit 12 is supplied to a color synchronization channel including units 25-29, inclusive, for enabling subcarrier-frequency reference signals of accurately controlled frequency and phase to be generated. To this end, the sync burst, which comprises approximately 10 cycles of a continuous 3.6 megacycle signal and occurs during the flyback interval of the line-scanning period, is selected and supplied by way of the band-pass amplifier 20 and a gated burst amplifier 25 to a phase detector system 26. Also supplied to the phase detector system 26 by way of a conductor 30 is a locally generated subcarrier reference signal generated by the 3.6 megacycle oscillator 29. This signal is compared with the received sync burst signal in the phase detector 26 and thence serves to develop a control signal which is supplied by way of a conductor 31 and controlled APC filter 27 to a reactance tube circuit 28 which, in turn, serves to control the frequency of the oscillator 29. In this manner, the operating frequency and phase of oscillator 29 may be accurately controlled relative to the transmitted signal. As a result, two locally generated reference signals, which commonly differ in phase by 90°, are supplied to the synchronous demodulators 22 and 23 to accurately control the color-detection angles thereof and hence the particular colors of the color-difference signals developed thereby.

The phase detector system 26 shown in Fig. 1 is a special type of phase detector system which might be termed a double phase detector system in that it includes two separate phase detector circuits, one of these circuits being represented generally by the units of the system 26 outside of the dashed line box 32 and serving to develop the control signal supplied to the reactance tube circuit 28. The other phase detector circuit represented primarily by the units within the dashed line box 32 serves to develop a switching-type control signal for causing the color synchronization channel to have two modes of operation depending on whether the oscillator 29 and the received sync burst are in-synchronism or are out-of-synchronism. To obtain such two-mode operation, the phase detector circuit 32 supplies a switching control signal by way of a conductor 33 to the APC filter 27 for controlling the band-pass characteristics thereof. This form of double phase detector system is commonly referred to as a "D.C. quadricorrelator" and is discussed in detail in a technical article entitled "The D.C. Quadricorrelator: A Two-Mode Synchronization System," by Donald Richman, appearing at pages 288-299, inclusive, of the January 1954 issue of the Proceedings of the I.R.E. This article also discusses the general operation of the color synchronization channels as a whole as well as the details of some of the specific units such as the controlled APC filter 27 and hence these matters need not be discussed at length herein.

The mode control signal from the switching phase detector 32 may additionally be supplied to a color-killer circuit 34 which, in response thereto, is effective to keep the chrominance-signal amplifier 21 either turned on or else disabled, depending on whether a color signal is being received by the receiver. In other words, when no color signal is being received, no sync burst is received and this, in turn, causes a particular type of output from the switching phase detector 32 which, in turn, controls the color-killer circuit 34 and causes it to disable the signal amplifier 21. This color killing is necessary in order to prevent translation of electrical noise and interfering signals by way of the chrominance-signal channel when only a monochrome signal is being received by the receiver. The color-killer circuit 34 may take the form of such circuits appearing at page 308 of an article entitled "Color Television Receiver Design—A Review of Current Practice," by Clapp et al., in the March, 1956 issue of the Proceedings of the I.R.E.

*Description of balanced phase detector system of Fig. 1*

The phase detector system 26 of the color synchronization channel of the color receiver of Fig. 1 illustrates a case where the teachings of the present invention may be used to good advantage. As mentioned, the phase detector system 26 is a double phase detector system wherein each of the individual phase detector circuits therein must be accurately balanced. In order to achieve a more accurate balance, such phase detector system 26 is constructed in accordance with the present invention and, to this end, comprises a first multi-unit tube envelope 40 including two tube units 40a and 40b of the same type. The system also includes a second multi-unit tube envelope 41 including two tube units 41a and 41b of the same type where the electrical characteristics of the first unit 41a are substantially identical to those of the first unit 40a of the first envelope 40 and the electrical characteristics of the second unit 41b are substantially identical to those of the second unit 40b of the first envelope 40. As illustrated, these multi-unit tubes may be of the twin diode type or of a type including twin or dual diode units in addition to further units.

A balanced circuit constructed in accordance with the present invention also includes circuit means for interconnecting one of the dual units of the first envelope with a matching one of the dual units of the second envelope to form the desired balanced circuit with an improved degree of balance. For the case where two such balanced circuits are required, additional interconnections may be made with the second units of the dual units to form the second balanced circuit. This is the case illustrated by the phase detector system 26 which includes circuit means interconnecting the two first units 40a and 41a to form a first balanced circuit, in this case a balanced phase detector circuit. This circuit means includes means such as a transformer 42 for supplying the received sync burst to the circuit and means such as a coupling condenser 43 for supplying a locally generated signal from oscillator 29 to the circuit. The first balanced circuit is in the form of two peak detector circuits coupled in push-pull relative to the sync burst input by way of the secondary winding 44 of the transformer 42 and coupled in parallel relative to the local reference-signal input represented by the condenser 43. The first of these peak detector circuits includes a resistor 45, a by-pass condenser 46, and the diode unit 40a while the second of these peak detector circuits includes a resistor 47, a by-pass condenser 48, and the diode unit 41a. A tuned circuit 49 which is tuned to the subcarrier frequency of 3.6 megacycles and is coupled to the common reference-signal input terminal 50 serves as an input impedance for the local reference signal as well as a series filter element for the output control potential which is developed across a high-frequency by-pass condenser 51.

In addition, the phase detector system 26 also includes circuit means interconnecting the two second units 40b and 41b to form a second balanced phase detector indicated approximately by the elements within the dashed line box 32, this second phase detector circuit 32 being substantially identical in form to the first phase detector circuit just discussed. In this manner, the second phase detector circuit 32 includes a pair of peak detector circuits coupled in push-pull relative to the sync burst by way of the secondary winding 44 and coupled in parallel relative to a reference-signal input point 66. The first of these detector circuits includes a resistor 60, a by-pass condenser 61, and the diode unit 40b while the second of these detector circuits includes a resistor 62, a by-pass condenser 63, and the diode unit 41b. A 3.6 megacycle tuned circuit 64 and a high-frequency by-pass condenser 65 serve the same purpose as before. The local reference signal is supplied to the common point 66 by way of a phase-shifting coupling condenser 67 which phase shift enables the second phase detector circuit 32 to produce a suitable switching control signal.

*Operation of balanced phase detector system of Fig. 1*

Considering now the operation of the phase detector system 26 just described, the advantages resulting from the proper pairing of the individual units from the two tube envelopes 40 and 41 serve to afford a substantial improvement in the degree of balance of each of the individual phase detector circuits. In order more properly to understand this, the normal operation of each phase detector circuit should be briefly considered.

Looking first at the phase detector circuit outside the dashed line box 32 and including the two tube units 40a and 41a, the locally generated reference signal from oscillator 29 is supplied by way of the conductor 30 and the coupling condenser 43 to the common point 50. This signal is applied equally across the two detector circuits and in the absence of the sync burst results in equal direct-current components appearing across the two by-pass condensers 46 and 48. At the same time, however, the sync burst signal is being supplied in push-pull by way of the secondary winding 44. As a result, the net alternating-current input signal across each of the detector circuits corresponds to the vector sum of the local reference signal and the appropriate sync burst component developed across the appropriate half of the push-pull winding 44. If the burst and reference signals are 90° out-of-phase, then the resultant alternating-current signals for both peak detector circuits are of equal magnitude and, provided the circuit is accurately balanced, equal rectified direct-current components will result across the two by-pass condensers 46 and 48. As a result, no direct-current component will appear across the high-frequency by-pass or output condenser 51 because of the bridge-like cosntruction of the phase detector circuit. This is precisely the operating condition which is desired to be obtained when the oscillator 29 is properly synchronized.

Figure 2:
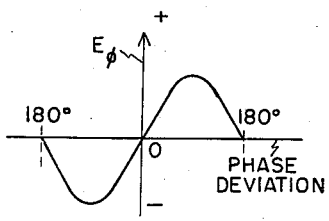
Figs. 2 and 3 are graphs used in explaining the operation of the phase detector system of Fig. 1.

If, however, the phase of the oscillator 29 signal changes from this optimum 90° relationship, then the resultant alternating-current signals across the two peak detector circuits become unequal which, in turn, causes the rectified components to be unequal and this causes a direct-current component to appear across the output condenser 51. The variation of this direct-current potential as a function of the deviation of the phase relationship from this optimum condition is indicated by the graph of Fig. 2. As a result, the output signal $E_4$ corresponding to the direct-current component across the condenser 51 may be supplied to the reactance tube circuit 28 to hold the phase of the oscillator 29 accurately in synchronism with the received signal. If the frequency of the local reference signal departs from the frequency of the sync burst, then the phases of the two signals are continually changing relative to one another and an asymmetrical sinusoid or beat note of low frequency is developed as the phase deviation varies back and forth across the characteristic curve of Fig. 2. The asymmetry is due to the circuit being in a feedback loop and such asymmetry contains a direct-current component which is effective to cause the reactance tube circuit 28 to pull the oscillator 29 back into frequency synchronism.

Figure 3:
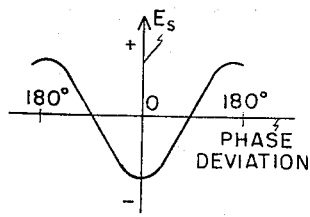

The operation of the second or switching phase detector circuit indicated generally within the dashed line box 32 is similar to that of the first phase detector circuit except that the local reference signal supplied to the common point 66 thereof is deliberately shifted in phase by 90° because of the presence of the coupling condenser 67. As a result, the direct-current component $E_s$ appearing across the output condenser 65 of this circuit is made to have a maximum value when the oscillator 29 is properly in-synchronism. The maximum value of this direct-current signal $E_s$ may be made to be of either negative or positive polarity, depending on the requirements of the units which it is to control. For the case illustrated, it is assumed to be of negative polarity as indicated by the graph of Fig. 3. As the oscillator 29 departs from the desired state of synchronism, the output signal $E_s$ decreases from this maximum negative value. For the case where the frequency of oscillator 29 differs from that of the sync burst, then the two signals are continually varying in-phase relative to one another so that the output signal across the condenser 65 becomes sinusoidal in nature due to the corresponding sinusoidal nature of the circuit characteristic indicated in Fig. 3.

When this occurs it may be said that the direct-current component across the output condenser 65 has fallen to zero. As a result, the direct-current signal across the output condenser 65 is, in general, either a maximum negative value or zero depending on the state of synchronism of the oscillator 29. As a result, this direct-current potential may be used to control the operating condition of both the APC filter 27 and the color-killer circuit 34.

Each of the phase detector circuits must be accurately balanced in order to prevent spurious direct-current components from appearing across the output condensers, namely, the condensers 51 and 65. This is particularly critical in the case of the first phase detector circuit which develops the signal which controls the reactance tube circuit 28 because the change in the direct-current component from the case where the oscillator 29 is in-synchronism to the case where it is substantially out-of-synchronism is not very great, being of the order of approximately 2 volts at best. As a result, any spurious direct-current components due to unbalance will have a substantial and undesirable effect on the control of the reactance tube circuit 28.

Figure 4:
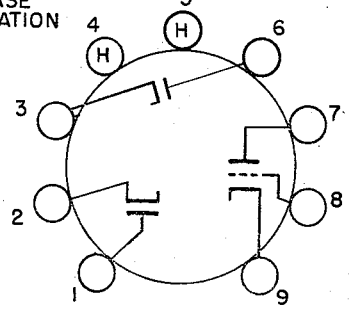
Fig. 4 is a schematic representation of the tube pin connections of a typical multi-unit tube which may be used in the phase detector system of Fig. 1.

Prior to the present invention, the practice was to use both of the units from the same tube envelope in a single one of the phase detector circuits. This, of course, created a source of unbalance due to the differences in lead wire inductance and interelectrode capacitance previously mentioned. This source of unbalance is illustrated by considering the schematic representation of the tube pin connections shown in Fig. 4 for a type 6BJ8 multi-unit tube, a currently popular tube in color receivers. The present invention, however, overcomes this source of unbalance by properly pairing matching units from the two different tube envelopes in a single phase detector circuit. There is no loss due to unused tube units because the second units from each envelope, which also match each other, are used in the second phase detector circuit. Thus, multi-unit tubes may, in accordance with the present invention, still be utilized without introducing undesirable amounts of unbalance.

While the present invention has been described with reference to electron tubes, it will be apparent that it is equally applicable to the case of transistors wherever such transistors are utilized in an equivalent manner. Thus, the term "tube" is intended to include the case of transistors and the invention may be applied to the case of multi-unit transistors as well as multi-unit electron tubes. Such multi-unit transistors are commonly referred to as "stick" transitors in which case the term "tube envelope" would mean the transitor stick.

While, as mentioned, the balance desired may be a balance of lead wire length or stray capacitance, nevertheless, the desired balance may take other forms such as, for example, a balance of plate resistances, amplification factors, transconductance factors, or, in the case of transistors, a balance of $\alpha$ or $\beta$ characteristics.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. In electronics equipment in which at least one balanced circuit is required to operate at relatively high frequencies where variations in tube construction can have an appreciable effect on the balance of the circuit, the improvement comprising: a first multi-unit tube envelope including two unconnected tube units of the same type but which are of different internal construction; a second multi-unit tube envelope identical to the first tube envelope; circuit means for interconnecting one of the dual units of the first envelope with a matching one of the dual units of the second envelope to form the desired balanced circuit with an improved degree of balance; and additional circuit means connected to the other of the dual units in the first and second envelopes for utilization thereof.

2. In electronics equipment in which two balanced circuits are required to operate at relatively high frequencies where variations in tube construction can have an appreciable effect on the balance of the circuit, the improvement comprising: a first multi-unit tube envelope including two unconnected tube units of the same type but which are of different internal construction; a second multi-unit tube envelope identical to the first tube envelope; circuit means for interconnecting one of the dual units of the first envelope with a matching one of the dual units of the second envelope to form a first of the desired balanced circuits; and circuit means for interconnecting the other of the dual units of the first envelope with the other and matching one of the dual units of the second envelope to form the second of the desired balanced circuits, the pairing of identical units in the same circuit in both cases serving to enhance the balance of the circuits.

3. A double phase detector system for the color synchronizing channel of a color-television receiver in which variations in tube construction can have an appreciable effect on the electrical characteristics thereof at the color synchronizing-signal frequency, the system comprising: a first multi-unit tube envelope including first and second unconnected tube units of the same type but each having different electrical characteristics at the color synchronizing-signal frequency; a second multi-unit tube envelope also including first and second tube units of the same type, where the electrical characteristics of the first unit are substantially identical to those of the first unit of the first envelope and the electrical characteristics of the second unit are substantially identical to those of the second unit of the first envelope; circuit means interconnecting the two first units to form a first balanced phase detector circuit; and circuit means interconnecting the two second units to form a second balanced phase detector circuit, the pairing of identical units in the same circuit in both cases serving to enhance the balance of the circuits.

4. A double phase detector system for the color synchronizing channel of a color-television receiver in which variations in tube construction can have an appreciable effect on the electrical characteristics thereof at the color synchronizing-signal frequency, the system comprising: a first multi-unit tube envelope including first and second diode units each having different electrical characteristics at the color synchronizing-signal frequency; a second multi-unit tube envelope also including first and second diode units, where the electrical characteristics of the first diode unit are substantially identical to those of the first diode unit of the first envelope and the electrical characteristics of the second diode unit are substantially identical to those of the second diode unit of the first envelope; circuit means interconnecting the two first diode units to form a first balanced phase detector circuit; and circuit means interconnecting the two second diode units to form a second balanced phase detector circuit, the pairing of identical diode units in the same circuit in both cases serving to enhance the balance of the circuits.

References Cited in the file of this patent

UNITED STATES PATENTS

| | | |
|---|---|---|
| 2,519,890 | Crosby | Aug. 22, 1950 |
| 2,718,546 | Schlesinger | Sept. 20, 1955 |
| 2,890,270 | Richman | June 9, 1959 |

FOREIGN PATENTS

| | | |
|---|---|---|
| 846,872 | Germany | Aug. 18, 1952 |